United States Patent [19]

Chau et al.

[11] Patent Number: 4,873,037
[45] Date of Patent: Oct. 10, 1989

[54] METHOD FOR PREPARING AN ASYMMETRIC SEMI-PERMEABLE MEMBRANE

[75] Inventors: C. C. Chau; Jang-hi Im; Otto C. Raspor; Lu H. Tung, all of Midland, Mich.

[73] Assignee: The Dow Chemical Company, Midland, Mich.

[21] Appl. No.: 253,458

[22] Filed: Oct. 5, 1988

[51] Int. Cl.$^4$ .................. B05D 3/00; B29C 43/30; B29C 47/06; B32B 31/00
[52] U.S. Cl. ........................... 264/49; 264/126; 264/134; 264/141; 264/171; 264/211.12; 264/320; 264/331.13; 264/331.15; 264/344; 427/412.3
[58] Field of Search .............. 264/41, 49, 126, 134, 264/141, 171, 211.12, 320, 325, 331.13, 331.15, 344; 427/412.3

[56] References Cited

U.S. PATENT DOCUMENTS

| | | | |
|---|---|---|---|
| 3,544,489 | 12/1970 | Dowbenko et al. | 264/49 X |
| 3,565,985 | 2/1971 | Schrenk et al. | 264/171 |
| 3,615,024 | 10/1971 | Michaels | 264/41 X |
| 3,763,055 | 10/1973 | White et al. | 264/41 X |
| 3,808,305 | 4/1974 | Gregor | 264/41 X |
| 3,839,516 | 10/1974 | Williams et al. | 264/41 |
| 3,843,570 | 10/1974 | Murayama | 264/49 X |
| 3,846,521 | 11/1974 | Osterholtz | 264/41 X |
| 3,852,388 | 12/1974 | Kimura | 264/41 |
| 3,862,030 | 1/1975 | Goldberg | 264/41 X |
| 3,884,606 | 5/1975 | Schrenk | 264/171 X |
| 3,901,810 | 8/1975 | Brooks et al. | 264/41 X |
| 3,920,785 | 11/1975 | Druin et al. | 264/41 X |
| 3,969,452 | 7/1976 | Ciliberti et al. | 264/41 |
| 3,992,495 | 11/1976 | Sano et al. | 264/49 X |
| 4,046,843 | 9/1977 | Sano et al. | 264/49 X |
| 4,100,238 | 7/1978 | Shinomura | 264/49 |
| 4,164,437 | 8/1979 | Henne et al. | 264/41 X |
| 4,188,354 | 2/1980 | Munari et al. | 264/41 X |
| 4,225,657 | 9/1980 | Klein et al. | |
| 4,340,479 | 7/1982 | Pall | 264/41 X |
| 4,439,584 | 3/1984 | Gould et al. | 525/127 |
| 4,623,670 | 11/1986 | Mutoh et al. | 521/61 |

Primary Examiner—Jeffery Thurlow
Assistant Examiner—Leo B. Tentoni

[57] ABSTRACT

A method for preparing an asymmetric, semi-permeable membrane containing a uniform microporous structure for gas and liquid separation, including forming a dense separation on one major surface of a microporous support structure. The microporous support structure is initially formed as a solid unitary film, fiber or sheet by the simultaneous extrusion of at least two streams of heat-plastified polymeric materials including at least two differentially soluble polymeric materials. The separation layer can be formed on the support structure prior to or after the soluble polymeric material has been dissolved out of, as by leaching from the solid support structure to form the microporous support for the separation layer. Preparation in this manner greatly reduces the tendency to form undesiralbe pinholes in the membrane.

34 Claims, 2 Drawing Sheets

METHOD FOR PREPARING AN ASYMMETRIC SEMI-PERMEABLE MEMBRANE

BACKGROUND OF THE INVENTION

This invention relates to a method of preparing asymmetric semi-permeable membranes containing uniform microporous structure. The membranes are useful for gas or liquid separation and can also be used for preparing composite membranes.

Asymmetric membranes have been employed in separation of dissolved substances from solvents and vice versa, typically by the action of a pressure, including reverse osmosis, dialysis and ultrafiltration processes for the separation of gases and liquids. As is well known, an asymmetric membrane structure is characterized by graded porosity, that is, a graded pore size progressing from one major surface of the membrane to the other surface thereof. The structure may (depending upon the process by which the membrane is prepared) present the porosity thereof as graded interconnected pores either (a) ranging from a relatively coarse pore size at one membrane face to a smaller undetermined size adjacent a dense nonporous layer forming the second face or (b) ranging from a relatively coarse pore size at one membrane face to some very small finite value at the opposite face of the membrane through which gas can freely pass. Typically, the asymmetric membrane is composed of a dense thin layer and a spongy layer intended to act as a supporting layer.

Asymmetric membranes have been made by preparing a three-component coating solution containing a polymeric film forming material, a first good volatile solvent for the polymer and, relative to the first solvent, a poor or less-volatile solvent for the polymer. The good and poor solvents are mutually miscible. A membrane is cast from the solution at room temperature, allowed to desolvate for a short time and then immersed into a liquid precipitating agent which is miscible with the good and poor solvents but is a nonsolvent for the polymer, and then drying the membrane.

In yet another method, asymmetric membranes have been prepared by a process comprising dissolving a fluorinated polymer in a first solvent, optionally adding to the solution a second solvent having a vapor pressure different from that of the first solvent and spreading or casting the composition onto an appropriate substrate. The spread solution is allowed to evaporate for a short time and then immersed in an appropriate solution at different temperatures. Similarly, isotropic membranes have been prepared by a method comprising forming a casting dope of a polymer in an organic solvent, casting a film of said casting dope, preferentially contacting one side of the film with a diluent characterized by a high degree of miscibility with the organic solvent and a sufficiently low degree of compatibility with the casting dope to effect rapid precipitation of the polymer, and maintaining the diluent in contact with the membrane until substantially all of the solvent has been replaced with the diluent.

Another method for preparing porous films having asymmetric structural characteristics involves preparing a casting solution at room temperature consisting of a polycarbonate resin and a casting solvent composed of one or more good solvents, casting a layer of the casting solution onto a smooth surface or support, permitting desolvation to occur from said layer of casting solution, immersing the layer and support in a quenching bath liquid, the quenching bath liquid being capable of dissolving the casting solvent and causing swelling of the polycarbonate resin content of the layer while being a nonsolvent for the polycarbonate resin. The immersion step initiates formation of a microporous membrane by entry of the quenching bath liquid into the casting layer and the removal of the casting solvent from the layer. The microporous membrane is removed from the quenching bath and any remaining casting solvent and quenching bath liquid is removed from the membrane.

While the prior art methods have provided acceptable asymmetric membranes, there is a continuing need for asymmetric membranes which display a high efficiency for the separation of individual materials from their mixtures.

SUMMARY OF THE INVENTION

In accordance with the present invention, asymmetric microporous membranes are prepared by forming a thin separation layer on a microporous substrate or support which has been formed by forming a melt of a lamellar composition formed from a plurality of alternating layers, each layer comprising at least two different polymeric materials, at least one of said different polymeric materials having a preferential solubility in a selective solvent with respect to at least one other of said different polymeric materials, wherein each said layer has been divided and reoriented to form discrete domains of random orientation in said melt; forming said melt into a thin solid unitary membrane structure; contacting said solid unitary structure with an extraction medium which has a preferential solubility for one of said two different polymeric materials to remove said preferentially soluble polymeric material from said solid unitary structure to form a porous unitary structure; and separating said extraction medium from said porous unitary structure.

In some procedures, the thin separation layer can be established on the support prior to or subsequent to the development of the required porosity by solvent extraction. In others, the separation layer or the means of forming it must be applied before solvent leaching.

The present invention provides membrane compositions which can be used for gas separations, liquid separations, ultrafiltration processes and as substrates for composite membranes. Membranes prepared in accordance with the invention are highly permeation selective, exhibit high permeation flux and physical strength and exhibit low amounts of flaws.

DESCRIPTION OF THE PREFERRED EMBODIMENT

Introduction

In the preferred embodiment, the thin separation layer of the asymmetric membrane of the present invention can be formed on the microporous support by a variety of techniques including: (1) crosslinking the surface of the support; (2) coating the surface of the support with a composition which will prevent the extraction medium which will be used on the microporous substrate or support from coming into contact with the surface of the support and which can be removed from the support after the desired extraction is completed; (3) providing the surface of the support with a polar characteristic by contacting the surface of the support with compositions which chemically modify the surface structure thereof; (4) coating the surface of the support with a composition exhibiting a high transmission rate for permeance; (5) coating the surface of the support with a composition which diffuses into the support for a limited depth and which provides a surface region which is essentially immune to the solvent extraction medium used on the support; or (6) various combinations of the foregoing treatments.

Two alternative embodiments are disclosed for forming the microporous support onto which the separation layer is formed. One involves comminuting a laminate of a plurality of alternating layers, each of which may include both said polymeric materials or each of which may include only one of said polymeric materials, remelting and recoextruding said comminuted material to form a second laminate of a plurality of layers, recomminuting the second laminate and molding said recomminuted laminate into a thin structure.

Another technique for forming the support, which is also believed to be the best mode, provides a continuous method by forming a melt composition comprising at least two different polymeric materials, at least one of said different polymeric materials having a preferential solubility in a selected solvent with respect to at least one other of said different polymeric materials; forming a stream comprising multiple adjacent layers of said melt composition; passing said stream through a mixing means; forming said mixed stream into a thin solid unitary structure; contacting said solid unitary structure with an extraction medium which has a preferential solubility for at least one of said at least two different polymeric materials, whereby said preferentially soluble polymeric material is removed from said solid unitary structure to form a porous membrane characterized by the presence of uniform pores having a narrow pore size distribution; and separating said extraction medium from said porous unitary structure.

Regardless of the method used for forming the substrate or support, the thin separation layer can in some procedures be provided before or after the interconnected porosity of the support structure has been developed by the solvent extraction step. In other procedures, the separation layer or the means of forming same must be applied before solvent leaching.

Comminution Method for Forming the Support

In one preferred embodiment, the lamellar composition comprising a plurality of alternating layers is formed from another melt of a lamellar composition comprising a plurality of thin layers of a first polymeric material interdigitated with thin layers of a second polymeric material, said first and second polymeric materials being different from each other and at least one of said first and second polymeric materials having a preferential solubility in a selected solvent with respect to the other of said first and second polymeric materials. Optionally, the layers of lamellar compositions can have interdigitated between each layer a thin layer of polymeric material which is effective to enhance the adhesion between layers. In a variation of this embodiment, each of said layers comprises a mixture of said different polymeric materials, rather than each layer comprising only one of said different polymeric materials.

In either variation, this first laminate is comminuted, remelted and recoextruded to form a second colaminate of a plurality of discrete layers. This second colaminate is then comminuted and the resulting particles are molded to form a thin structure. The resulting thin structure is contacted with an extraction medium which has a preferential solubility for at least one of said different polymeric materials to remove said preferentially soluble polymeric material from said second extrudate to form a porous extrudate and seprating said extraction medium from said thin structure.

Yet another variation is broadly operable, especially where each layer of the first laminate comprises a mixture of said first and second polymeric materials. In this variation, said first laminate is comminuted and the resulting comminuted material remelted, recoextruded and directly formed into said thin membrane structure without recomminuting. This membrane structure is then contacted with said preferential solvent as above.

In forming microporous membranes in accordance with this invention, there must be employed at least two different film-forming thermoplastic polymeric materials which, with respect to each other, exhibit a differential solubility in a common solvent, be it an aqueous or nonaqueous solvent. Particularly preferred are combinations of water-soluble polymers with water-insoluble polymers and crystalline polymers with noncrystalline or amorphous polymers. It should be noted that combinations of the same kinds of polymers, for example, mixtures of two or more different water-soluble, two or more different water-insoluble, two or more different crystalline or two or more different amorphous polymeric materials can be used, providing that the requirement that a differential solubility between at least two of such materials is met. The soluble polymeric material generally will comprise from 10 to 98 volume percent, preferably 30 to 85 volume percent and most preferably 50 to 80 volume percent, of the total soluble and insoluble polymeric composition.

Given the criterion of differential solubility, substantially any film forming thermoplastic polymeric material can be employed in the practice of the invention. Suitable thermoplastic polymeric materials include the acrylonitrile-butadiene-styrene resins, acetal homopolymers and copolymers, acrylics, cellulosics, fluorocarbons, ionomers, low permeability thermoplastics, polyamides, polyaryl ethers, polyaryl sulfones, polycarbonates, thermoplastic polyesters, polyether sulfones, polyolefins, e.g., polyethylene, polypropylene, polybutylene and polyallomers, polyimides and polyamide-imides, polymethylpentene, polyphenylene oxide, polyphenylene sulfides, polystyrenes and other polyvinylidene aromatic resins, polysulfones and vinyl polymers including polyvinyl acetals, polyvinyl acetate, polyvinyl alcohol, polyvinyl carbazole, polyvinyl chloride, polyvinyl chloride-acetate and polyvinylidene chloride. Representative combinations include polyethylene-polystyrene, polypropylene-polystyrene, polypropylene-polyisobutylene, polysulfone-polyvinyl alcohol and polycarbonate-methylcellulose. Compatibilizing and/or adhesion enhancing layers include rubbery material such as a styrene-butadiene-styrene triblock copolymer and, when each layer comprises a mixture of two or more different polymeric materials, the compatibilizing layer is preferably one of the polymers used in the blend.

The laminates of adjacent discrete layers of polymeric material which are required above are formed by coextrusion. Coextrusion or simultaneous extrusion of two or more synthetic resinous materials is well known in the art and has been used for preparing sheet or film containing many layers, for example, 50, 100 or several hundred layers. A method and apparatus for such extrusion is disclosed in U.S. Pat. Nos. 3,565,985 and 3,884,606, herewith incorporated by reference. Coextrusion can be broadly described as a method for preparing a composite stream of interdigitated diverse synthetic resinous materials comprising providing at least a first stream of a heat-plastified synthetic resinous material and a second stream of heat plastified thermoplastic material, dividing each of the streams into a plurality of first substreams and a plurality of second substreams, respectively; combining the substreams to form a composite stream having the first substreams and the second substreams interdigitated, and forming the stream into a desired configuration having at least one major surface wherein the layers of the composite stream lie generally parallel to a major surface of the desired configuration.

It has been discovered that this coextrusion technique can be adapted to prepare membranes of channelized porous structure with controlled pore size, distribution and porosity. The adaptation of coextrusion technology provides a means of making extremely fine; regular and alternating domains from two or more polymer components. By making films or sheets out of the finely pelletized or pulverized microlayered blends without disturbing the morphology and leaching out at least one of the components by using conventional solvent leaching processes, porous membranes with extremely narrow pore distributions can be obtained. The pore size is now determined by the thickness of layers or the number of passes through the coextrusion process rather than the extent of mixing, compounding or stretching. The process is much more stable and less complicated than currently employed conventional processes. In addition, the porosity, pore morphology and mechanical strength can be controlled by adjusting the number of layers, relative layer thickness, layer arrangement and the materials chosen.

The thickness of the individual layers in the starting composite of adjacent layers is an important factor in determining the ultimate pore size of a porous membrane made in accordance with the present invention. Each of the thin layers should have a thickness in the range of from 0.03 to 5 microns, and preferably 0.03 to 1 micron, and most preferably 0.03 to 0.5 micron. Except to the extent that it determines the thickness of the individual layers, the number of layers in the coextruded laminate is not critical. In most coextrusion systems, fewer layers means that each layer is thicker. We have coextruded from 50 to 400 layers and processed them in accordance with the present invention. Pore size tends to decrease with thinner layers, but as the layers become ever thinner, the correlation between pore size and layer thickness is not a direct one.

The initial laminate is comminuted using conventional techniques. Pulverization of the laminate using conventional apparatus is typical.

It has been found that pore size and distribution can be advantageously affected by employing more than one recycle through the coextrusion apparatus. Currently, experience indicates that up to three passes of the blended compositions through the coextrusion apparatus appears to be optimum.

The laminate resulting from the final pass is pulverized and the granules are reformed into a thin film having a substantially uniform thickness by compression molding, sintering, compaction or any other known method under conditions such that the chosen method of preparing the film does not disturb to any significant degree the morphology of the intermediate melt state which exists during this film forming period. The film is leached by immersion, solvent washing, solvent jet spraying or any other known technique to selectively dissolve at least one of the polymeric materials from the film while leaving at least one polymeric component substantially untouched, to form a membrane having a microporous structure. The membranes prepared in accordance with this invention are characterized by a homogeneous microporous structure with a small pore size, narrow pore size distribution and a sharp size or molecular weight cutoff.

Figure 1:
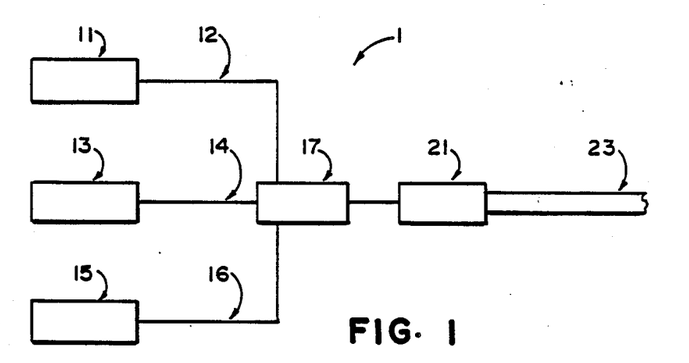
FIG. 1 schematically depicts an apparatus and method for preparing lamellar compositions suitable for the support structures upon which the separation layer can be formed to create the asymmetric membranes of the invention.

FIG. 1 schematically depicts apparatus and method which can be employed in the present invention. The apparatus, generally designated by the reference numeral 1, comprises in operative combination first, second and third sources of heat-plastified thermoplastic resinous material designated as 11, 13 and 15, respectively, which are extruders. A stream combining means 17 is in operative communication with sources 11, 13 and 15 through suitable conduits 12, 14 and 16, respectively. The discharge side of stream combining means 17 is in operative communication with a layer multiplying means 18 which has an inlet side in operative communication with stream combining means 17 and a discharge side in operative communication with a stream shaping means 21. The layer multiplying means 18 is adapted to mechanically manipulate a composite layered stream to provide an increased number of layers. While preferred, the use of layer multiplier means 18 is optional. Should apparatus 1 not include multiplier means 18, stream combining means 17 is in operative communication with stream shaping means 21.

Shaping means 21 has an appropriately shaped orifice to reform the stream from combining means 17 or the layer multiplying means into an appropriate product 23, such as pellets, sheet or film. After cooling, product 23 can be stored, pulverized and formed into a unitary structure and subsequently contacted with extraction medium to form the porous membranes of the invention or pelletized and recycled through apparatus 1.

Figure 2:
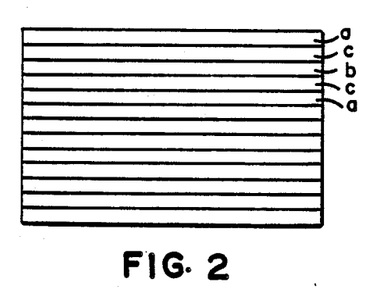
FIGS. 2 and 2a schematically depict coextruded lamellar compositions which are used in one embodiment to prepare the support structures of the asymmetric membranes of the invention.
Figure 2A:
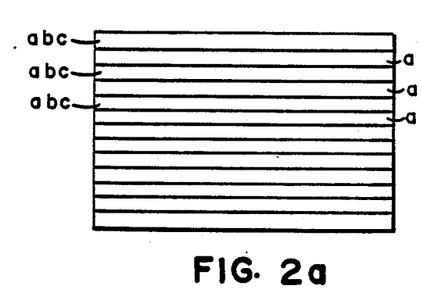

FIGS. 2 and 2a schematically depict the product 23 which is produced in apparatus 1. When the feedstock plastified in sources 11, 13 and 15 comprises melts of individual diverse polymers, such as melts of polyethylene (a), polystyrene (b) and styrene-butadiene-styrene block copolymer (c), respectively, product 23 is a laminate comprising a plurality of thin alternating layers of polyethylene (a)/styrene-butadiene-styrene copolymer (c)/polystyrene (b)/styrene-butadiene-styrene copolymer (c) . . . , as shown in FIG. 2. When the feedstock includes a blend of diverse polymeric materials, such as a mechanical blend of polystyrene and polyethylene or a previously coextruded and comminuted composition comprising a plurality of alternating layers of the individual polymers, product 23 will comprise a lamellar composition in which each layer will comprise a blend of the different polymers, which can optionally be interdigitated with layers of a different composition, such as one or the other of the different polymers, as shown in FIG. 2a.

Figure 3:
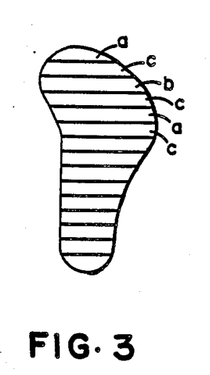
FIGS. 3 and 3a schematically depict comminuted feedstock materials for use in forming the support structures.
Figure 3A:
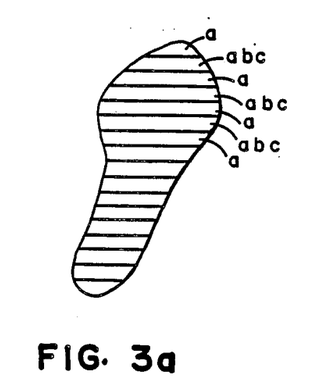

FIGS. 3 and 3a schematically depict alternate feedstock to sources 11, 13 and 15 of apparatus 1. This alternate feedstock typically results from pulverizing a layered composition, such as a product 23, to obtain small layered particles comprising a plurality of thin interdigitated alternating layers of different polymeric materials, FIG. 3, or thin interdigitated alternating layers of a blend, mechanical or otherwise, of diverse polymeric materials, FIG. 3a. The thickness of the final membrane material which is to be leached comprises typical thicknesses for such materials. Such thicknesses typically vary from about 0.5 to about 10 mils. Although it is contemplated that this invention will be used primarily to form microporous membranes, it is conceivable that other forms would also be desired, as for example, microporous granules, fibers, etc.

Continuous Flow Support Formation Method

The plural adjacent layers or laminate which must be formed in this embodiment of the present invention are formed by coextrusion, as described above, except that in this embodiment, the interdigitated layers are passed through a motionless mixer while in melt form. Coextrusion as employed in this embodiment can be broadly described as a method for preparing a composite stream of interdigitated diverse synthetic resinous materials comprising providing at least a first stream of a heat-plastified synthetic resinous material and a second stream of heat-plastified thermoplastic material; dividing each stream into a plurality of first substreams and a plurality of second substreams, respectively; combining the substreams to form a composite stream having the first substreams and the second substreams interdigitated; passing the interdigitated substreams through a motionless mixer where the stream of layers is divided and reoriented into a nonlayered configuration of discrete domains of said polymeric materials of random orientation and discharging the stream through a forming die to form a desired configuration such as a film, sheet, pellet or hollow fiber, depending upon the geometry of the forming die. Optionally, the blend layers of the composite stream can have interdigitated between each layer a thin layer of polymeric material which is effective to enhance the adhesion between the layers or improve compatibility between them.

The adaptation of a coextrusio apparatus such as disclosed in U.S. Pat. Nos. 3,656,985 and 3,884,606, both herein incorporated by reference, by incorporating a motionless mixer 23a between the layer multiplier 21a, or between the stream combining means 17e, and the shaping means 25a (FIG. 4) provides a continuous system of preparing microporous membranes with extremely narrow distributions. The pore size of membranes produced in accordance with this invention is determined by the thickness of layers. The process is more stable, less complicated and more efficient than currently employed conventional processes. In addition, the porosity, pore morphology and mechanical strength can be controlled by adjusting the number of layers, relative layer thickness, layer arrangement and the materials chosen.

The thickness of the individual layers in the starting composite of adjacent layers is an important factor in determining the ultimate pore size of a porous membrane made in accordance with this embodiment, in the same manner as described above in connection with the comminution embodiment.

Figure 4:
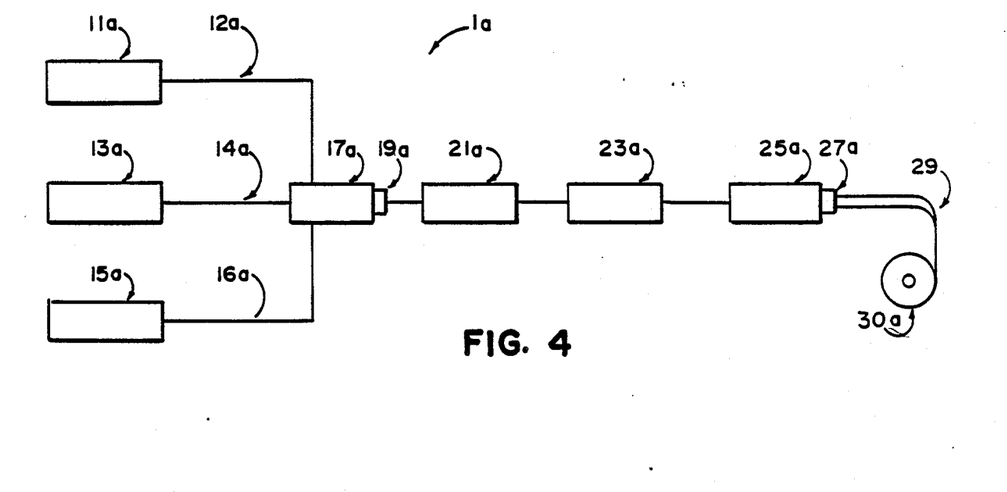
FIG. 4 schematically shows an alternate apparatus and method for forming the support structures.

The apparatus 1a schematically depicted in FIG. 4 comprises in cooperative combination individual sources of heat-plastified thermoplastic polymeric material designated as 11a, 13a and 15a, respectively, which beneficially are extruders. A stream combining means 17a is in operative communication with the extruders 11a, 13a and 15a by suitable conduits 12a, 14a and 16a, respectively. The apparatus or stream combining means 17a has a discharge side 19a which is in operative communication with layer multiplying means 21a, which has an inlet side in open communication with discharge side 19a and a discharge side in open communication with a motionless mixing device 23a. Layer multiplying means 21a, while preferred, is also optional in this embodiment. The motionless mixer 23a serves to divide and reorient the layers of polymeric materials into discrete, random domains.

Figure 5:
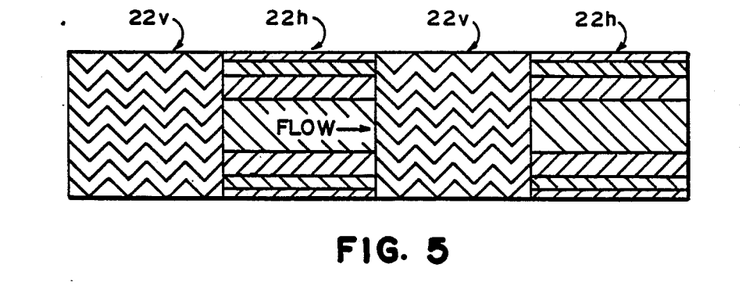
FIG. 5 is a schematic representation of the mixing elements of a static mixer used in the FIG. 4 apparatus.
Figure 6:
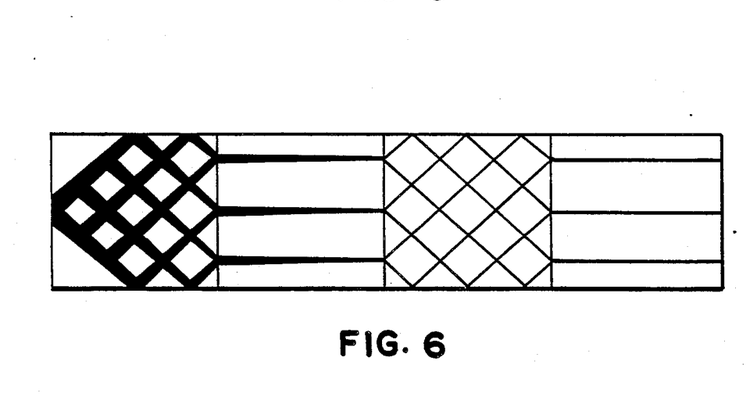
FIG. 6 is a schematic representation of the flow pattern defined by the static mixing elements of the mixer of FIG. 5.

The discharge side of motionless mixing device 23a is in operative communication with a stream shaping means or film or sheeting die 25a. Motionless mixing device 23a is fixed stationarily to the discharge side of layer multiplying means 21a or, alternatively, to the discharge side 19a of stream combining means 17a, and to the inlet side of stream shaping means 25a. Motionless mixing devices such as the device 23a are conventional and well known in the art. Representative examples of conventional motionless mixing devices are disclosed in U.S. Pat. Nos. 3,286,992; 3,785,620; 3,821,624; 3,953,002; and 4,408,893. A representative motionless mixing device 23a is of the type manufactured and sold by Koch Engineering Co., Inc., Wichita, Kans. 67220, under the designation Koch Melt Blender TM. Basically, motionless mixing device 23a includes a plurality of vertical flow elements 22v and horizontal flow elements 22h arranged and connected in coaxial end-to-end relation with the adjacent edges of adjacent baffle members arranged to extend generally parallel to one another (FIG. 5). It is preferred that the motionless mixing device comprise a plurality of such baffle elements 22v and 22h, for example, 4 to 12 or more. Thus, in conventional manner, the motionless mixing device 23a is operative to repetitively divide and recombine the flow of layered thermoplastic material discharing from stream combining means 17a or from layer multiplier 21a to effect a laminar flow mixing or blending of the lamellar material, thereby to homogenize the material to break up the layered configuration of the stream and to increase the homogeneity of the dispersion of small individual layered increments within the stream. Shaping means 25a has an orifice 27a definig an appropriate desired geometric shape. Product 29a is passed from the orifice 27a, cooled and wound onto the roll 30a. Alternatively, product 29a can be pelletized and recycled back to 11a, 13a and 15a, or passed directly to a liquid extraction bath, not shown.

In operation of the apparatus of FIG. 4, the sources 11a, 13a and 15a supply heat-plastified synthetic resinous material through the conduits 12a, 14a and 16a, respectively, to the combining apparatus 17a wherein the streams are divided, interdigitated and passed to the discharge 19a as a composite layered stream in which the layers are substantially parallel to each other. The composite stream is passed from discharge 19a to layer multiplier means 21a and thence to the motionless mixer 23a where the stream is intermixed through a progression of divisions and recombinations whereby the essentially layered configuration of the stream is divided and reoriented into discrete, random domains. The stream exiting motionless mixer 23a is passed through shaping means 25a where it is extruded through orifice 27a in the form of a thin structure such as pellets, film, sheeting or hollow fibers.

Thus, in forming microporous membranes in accordance with this embodiment, a substantially homogeneous mixture of at least two different polymeric materials, at least one of said different polymeric materials having a preferential solubility in a selected solvent with respect to at least one other of said different polymeric materials, is reduced to a heat-plastified state, formed into a plurality of interdigitated thin layers, wherein each layer has a thickness in the range from 0.03 to 5 microns, preferably 0.03 to 1 micron and most preferably in the range of 0.5 micron or less, and passed through a motionless mixer where the layered configuratin is broken up and individual polymeric materials are dispersed to form domains of each within the other and ultimately discharged through the forming die. The resulting product in the form of a film or hollow fiber or the like is leached by immersion, solvent washing, solvent jet spraying or any other known technique to selectively dissolve at least one of the polymeric materials from the film while leaving at least one polymeric component substantially untouched, to form a membrane having a microporous structure. The membranes prepared in accordance with this invention are characterized by homogeneous microporous structure with a small pore size, narrow pore size distribution and a sharp size or molecular weight cutoff.

In a particularly preferred embodiment, there are provided individual heat-plastified streams of a mixuture of polymer A, such as polyethylene; and polymer B, such as polystyrene; employing a coextrusion apparatus such as disclosed in U.S. Pat. No. 3,884,606 modified in accordance with this invention through the incorporation of a motionless mixer between the composite stream forming head and the shaping die. Each of the individual streams are divided into a plurality of substreams which are then combined to form a composite stream having the individual substreams interdigitated. When more than two different polymeric materials are employed, for example, a third polymeric material can be employed as a compatibilizer or as an adhesion promoting or improving adjuvant, the third polymeric material will be interdigitated between each of the individual layers. Otherwise, one can employ one or the other of the polymeric materials A or B as a compatibilizing stream to be interdigitated between each individual blend stream.

The blend stream exiting the motionless mixer is discharged ultimately through an appropriate shaping die and formed into a desired configuration. It has been found that pore size and distribution can be advantageously affected by employing more than one recycle through the coextrusion apparatus. Currently, experience indicates that three passes of the blended compositions through the coextrusion apparatus appears to be optimum. While more recycles can be made, the advantages accruing from more than three passes do not justify the additional expense. When one uses more than one pass, one can start by segregating the two polymers into separate layers. When the resulting melt is recycled, each layer will comprise a blend of the two polymers. If only one pass through the apparatus is desired, the two polymers must be initially blended to give a combination of both in each layer.

The method of this embodiment employs controlled mixing to in situ mix a layered melt stream before the melt stream exits from an extrusion die. This process permits the in situ conversion of the layered structure into a useful morphology consisting of discrete domains distributed randomly in a continuous matrix. When the material inside the domain is extracted out from the extruded films, membranes with interconnected flow channels, narrow pore sizes and narrow pore size distribution can result. The in situ mixing method not only provides effective control over pore size and pore size distribution but can also provide membranes with a pore size smaller than normally previously obtained. The method provides for an on-line continuous processing with enhanced process stability and process control. In addition, the morphology and transport properties of the final membrane can be more readily controlled by the choice of equipment and its arrangement in the extrusion line.

The same polymeric materials as described above in connection with the comminution method for forming the microporous membrane support can be used in this alternative. This includes the optional use of compatibilizing and/or adhesion enhancing layers interposed between polymer blend layers. As above, the soluble polymeric material generally will comprise from 10 to 90 volume percent, preferably 30 to 85 volume percent and most preferably 50 to 80 volume percent of the soluble-insoluble polymeric composition.

Compatibilizing Layers In the Support

Preferred embodiments of the invention will typically include a compatibilizing or adhesion enhancing component which is interdigitated between each layer of individual different polymeric materials or each blend layer of diverse polymeric materials particularly. Compatibilizing components are components which are employed in an amount sufficient to improve the compatibility between the diverse polymeric materials. The amount of compatibilizing component typically ranges from 0 to 50, preferably 5 to 20, weight percent, based on the total weight of the membrane composition prior to treatment with the extraction medium. The type of compatibilizing component can vary depending upon factors such as the compositions of the necessary polymeric compositions which are employed. For example, when polymeric components such as polystyrene and polyethylene are employed, a thermoplastic elastomer such as a styrene-butadiene-styrene block copolymer can be employed as a compatibilizing component. In instances when each layer comprises a mixture of two or more different polymeric materials, the compatibilizing layer is preferentially one of the polymers used in the blend.

The Separation Layer

The support structure which is formed from melts of layered compositions comprising diverse polymeric materials is then treated to develop a thin separation layer on one major surface of the membrane support structure and porosity throughout the remainder of the support structure, with the porous structure extending from the separation layer to the opposite face of the support structure. The thickness of the support will vary with the intended application. 5 to 100 microns will be typical.

The separation layer is preferably in the form of a dense continuous layer having a minimum of flaws. Typically, the dense layer will have a thickness from about 0.03 micron or less to about 25 microns. Typically, the thickness of the dense layer ranges from about 0 to about 50% of the total thickness of the untreated polymeric composition, that is, the original thickness of the support.

The provision of the separatin layer on one surface of the support can be accomplished by a variety of techniques either prior to or subsequent to the development of porosity in the support structure:

1. The surface of the support can be crosslinked;
2. The surface of the support can be coated with a composition which is effective to prevent the extraction medium from coming into contact with the surface of the support and which can be removed from the support after the desired amount of extraction is completed;
3. The surface of the support can be provided with a polar characteristic by contacting the surface with compositions which chemically modify the surface structure;
4. The surface can be coated with a composition which exhibits a high transmission rate for permeance yet is capable of protecting the surface from attack by the extraction medium; or
5. The surface can be coated with a composition which is capable of diffusing into the support surface to a limited depth and can be processed in order to provide a surface region which is essentially immune to the extraction medium.

It is noted that combinations of these treatments can be utilized to provide the separation layer.

Crosslinking of the surface of the support can be accomplished by a variety of techniques. The polymer composition can be radiated using ultraviolet radiation or electron beam radiation. Radiation sensitive polymers can be modifed with various components and subjected to low amounts of a radiation in order to provide crosslinking. Dimethylmaleimide-modified polystyrene can be coextruded with polyethylene and subjected to ultraviolet radiation. Crosslinking can also be accomplished by employing polymeric materials such as polyurethane and acrylic resins as one or more of the diverse polymers. Such polymers contain reactive moieties that can be contacted with compositions containing crosslinking agents such as polyfunctional alcohols and free radical polymerization initiators such as benzoyl peroxide.

Compositions which are effective to protect the surface of the support structure can be applied using means such as coating, dipping, spreading, plasma coating, extrusion and the like. It is possible to apply the compositions using a pressurized flow technique, for example, when a hollow fiber form of the composition is employed.

Compositions whic prevent the extraction medium from coming into contact with the surface of the support can include, for example, numerous water-soluble or water-dispersible polymers which are not as susceptible to extraction as is the more soluble of the diverse polymeric materials present in the support composition. Examples of such materials include polyacrylic acid, polymethacrylic acid, polyacrylamide, polysodium acrylate containing polymers, methylcellulose, polyvinyl alcohol, and the like. These chemicals are applied to the surface when dispersed or dissolved in a suitable solvent. The treating agents can be applied as a coating having a thickness which is adequate to substantially prevent the extraction medium from coming into contact with the surface of the support during the extraction process. Typically, the thickness of such coatings can range from about 0.03 micron to about 25 microns. These materials are removed after the desired degree of extraction is accomplished. For example, a water-soluble or water-dispersible material is removed by contacting the membrane composition with an aqueous liquid following the extraction process.

Compositions which provide polar characteristics to the surface of the support structure typically are materials which can chemically modify the surface structure of the support. Such treatments include surface sulfonation, halogenation, carboxylation, phosphonation, amination, etc., to the surface. The substrate surface can be treated with sulfur trioxide, bromine, concentrated sulfuric acid, fluorine, oxidative plasma, ammonia, and the like. The chemically modified surface generally has a high resistance to extraction caused by solvents. For example, it is desirable to employ essentially nonpolar solvents when the surface region of the support has a relatively polar character. The properties of such a chemically modified surface can be altered depending upon the composition employed, the degree of treatment of the surface with the composition and etc. Thus, it is possible to alter properties of the separation layer, such as thickness, depending upon the type of treatment of the support substrate with the treating composition. Strict control of time and temperature during the extraction process is not generally required. The high resistance to extraction which is present in the chemically modified surface allows for the preparation of a separation layer which is less likely to contain undesirable flaws such as holes.

Materials which exhibit a high transmission rate for permeance and are capable of protecting the surface of the support from attack by the extraction medium can include, for example, numerous rubbery polymers. Examples of such polymers include polybutadiene, polyisoprene, the polysiloxanes, ethylene-propylene copolymers, polychloroprene, and the like. If desired, these materials can be crosslinked using a suitable conventional vulcanization process. The thickness of the coating can vary from about 0.03 micron to about 25 microns.

Materials which are capable of diffusing into the surface of the support to a limited depth and can be processed to provide a surface region which is substantially immune from being contacted with the extraction medium include such polyfunctional materials as divinyl benzene, ethylene dimethacrylate, epxoy resins and the like. Such polyfunctional materials which are diffused into the surface region of the support can be processed in order to provide a crosslink network. Processing techniques include various types of curing such as thermal, electron beam or ultraviolet radiation cure.

Solvent Extraction of the Support

The development of porosity in the support structure can be accomplished before or after the development of the separation layer by contacting the support structure with an appropriate extraction medium to effect dissolution of the more soluble polymeric material from the substrate. By the term "dissolution" is meant the formation of a porous support structure. The porous substrate comprises substantially the polymer composition which is substantially insoluble in the extraction medium. The selection of the extraction medium, time of treatment and temperatures for the process depend upon the diverse polymers which form the support structure. Chloroform or toluene can be employed to leach polystyrene from polyethylene or polypropylene. Hexane or toluene are effective to leach polyisobutylene from polypropylene. Water can be employed to leach polyvinyl alcohol from polysulfone or methylcellulose from polycarbonate. The extraction medium is removed from the membrane composition using a variety of conventional techniques.

The asymmetric membrane compositions of this invention are useful in the separation of dense gases and in the separation of dense liquids. The asymmetric membranes are particularly effective in the separation of gaseous mixtures, with excellent permeation rates and selectivity. Representative of such gaseous mixtures are those found in a wide variety of industrial gas or exhaust streams. For example, the membranes resulting from the process of this invention can be used to markedly increase the concentration of hydrogen and mixtures of hydrogen, nitrogen, methane, argon and ammonia typically resulting from the synthesis of ammonia. In addition, the membranes can be used for the separation of hydrogen and carbon monoxide, helium from natural gases such as air, hydrogen from petrochemical process streams, oxygen from air, hydrogen from ammonia and, in general, the separation of one rapidly diffusing gas from less permeable gases.

The following examples are presented to further illustrate but not limit the scope of this invention. All parts and percentages are by weight unless otherwise indicated.

EXAMPLE 1

Asymmetric Membranes Prepared By Laminating Polyarylate Films On Porous Substrates Made From Microlayer Blends A. Support Formation Microlayer pellets containing 50% polyethylene and 50% polystyrene were prepared by using the microlayer coextrusion equipment. They were arranged to contain approximately 400 alternating layers with 10% additional styrene-butadiene-styrene block copolymer rubber interdigitated between the layers as a compatibilizer. The thickness of each polyethylene and polystyrene layer, as estimated from the total film thickness and the number of layers, was about 4 microns.

A new microlayer coextruded blend was then made by reextruding the pellets using the same microlayer coextrusion process. It was arranged to contain 400 blended layers with a total of 11% additional polyethylene used between those layers. The overall materials ratio as calculated was 55% polyethylene/45% polystyrene/7% rubber compatibilizer. The coextruded blend was pelletized. 50 grams of the pellets were stored in a liquid nitrogen filled dewar for 5 minutes to rigidify the pellets. They were then ground into fine powders by using a Retsch Centrifugal Grinding Mill. Thin films were then made from the powders by using the following procedures:

a. 2 grams of the powders were sprayed uniformly in a 2 inch diameter platen and compacted under 500–1,000 psi pressure in a Loomis 60 ton platen press for 2 seconds.

b. The load was released and the sample chamber evacuated. A pressure of 15,000 psi was applied to the platen for 10 seconds to compact the sample into a round disc of about 2 inch diameter and 2 mm thick.

c. The disc was annealed in an oven at 130° C. for 15 minutes.

d. The disc was compacted in a 250 ton Erie Press under 7,500 psi pressure at 130° C. for 2 seconds to sinter the sample into a uniform piece of film. It was cooled under pressure by water circulation. The thickness of the film was about 2 mil.

Samples (1"×1") cut from the films were immersed in chloroform-filled bottles. The bottleswere loaded in an Eberbach mechanical shaker for 16 hours to extract out the polystyrene. The films were then dried in a vacuum oven for 3 hours.

B. Forming the Separation Layer

Two grams of polyarylate resin (Ardel ® D-100, Union Carbide Corp.) were dissolved into 15 mL chloroform to form a homogeneous dilute solution. Five drops of the solution were cast onto the surface of deionized water in a 3 inch diameter glass beaker. As soon as the polymer solution was spread out to cover the whole surface area by water surface tension, a stream of nitrogen was blown onto the solution surface to evaporate the solvent. Thin polyarylate films were formed and were removed by using a glass plate, they were dried in air for about 1 hour. The thickness of the film ranged from 5 to 10 microns as measured by using a micrometer.

Polyisobutylene dilute solution was prepared by dissolving 0.05 grams of Vistanex MM L-80 (Exxon) resin into 60 ml of hexane. Several drops of the solution were spread uniformly on the surface of the prepared porous substrate or support and the substrate was dried in vacuum for about 1 hour. Polyarylate thin film samples were put on the top of the coated substrate surface, the whole assembly was sandwiched between two pieces of glass plate, topped with a 700 grams lead weight, and annealed at 120° C. for 10 minutes in an oven. The thin polyarylate film was found to adhere well to the porous substrate.

C. Test

The permeability of $O_2$ and $N_2$ through the membrane sample and their separation factor was measured by using a conventional gas permeation test apparatus. The results at 23° C. are shown in the following table:

| Sample No. | Preparation Method | Nominal $O_2$[1] Permeability | Selectivity[2] $O_2/N_2$ |
|---|---|---|---|
| 1-1 | Lamination, 7 | $1.01 \times 10^{-8}$ | 4.82 |

-continued

| Sample No. | Preparation Method | Nominal $O_2$[1] Permeability | Selectivity[2] $O_2/N_2$ |
|---|---|---|---|
| | microns film | | |
| 1-2 | Solvent cast, 2.15 mil[3] | $9.75 \times 10^{-9}$ | 5.15 |
| 1-3 | Data on polyisobutylene from Exxon Pub. SYN-76-1434, p. 11 (25° C.) | $9.0 \times 10^{-9}$ | 4.09 |

Notes:
[1] In cc-cm/cm$^2$-sec-atm, based on the coating thickness.
[2] Selectivity is the ratio of permeability of oxygen to nitrogen.
[3] Prepared by dissolving 2 grams of resins in 15 ml chloroform and casting the solution on glass.

The data show that porous substrates made of microlayer blends are excellent support structures to which thin dense separation layers, such as the thin layer of polyarylate, can be laminated. The oxygen permeability and $O_2/N_2$ selectivity obtained with a thin dense separation layer supported on the porous substrate compared with that of a solvent cast dense separation film prepared by using a conventional solvent casting technique demonstrate that asymmetric membranes prepared in accordance with the principles of the invention are excellent tools for separating gaseous mixtures, with an $O_2/N_2$ selectivity of 4.82 at a 7 micron thickness versus an $O^2/N_2$ selectivity of 5.15 for the 2.15 mil solvent cast membrane.

EXAMPLE 2

Asymmetric Membranes prepared By Coating Styrene-Butadiene Block Copolymers On Porous Substrates A. Support Formation Thin films of polyethylene/polystyrene/styrene-butadiene-styrene block copolymer rubber blend were prepared by using the same method as that in Example 1. The thickness of the film was about 2 to 4.5 mil. They were immersed in chloroform filled bottles. The bottles were loaded in an Eberback mechanical shaker for 16 hours to leach out the polystyrene. The films were then dried in a vacuum oven for 3 hours. According to the mercury intrusion results, the mean pore size of the membrane was about 0.3 micron with a distribution which ranged from 0.07 to 0.5 micron.

B. Separation Layer Formation

Several drops of styrene butadiene block copolymer (SBBC)/toluene solution (2 grams in 15 ml) were spread on the surface of the substrate support by using an eye dropper. The coating was dried in air for one hour, the thickness of the coating was determined by measuring the thickness of the membrane before and after coating by using a Brown & Sharae micrometer. The permeability of $O_2$ and $N_2$ through the membrane was measured by using the same testing apparatus as that in Example 1; the results at 24.5° C. are shown in the following table:

| Sample No. | Preparation Condition | Nominal $O_2$[4] Permeability | Selectivity $O_2/N_2$ |
|---|---|---|---|
| 2-1 | Coating, ~1.2 mil | $3.33 \times 10^{-8}$ | 3.11 |
| 2-2 | Solvent cast, | $3.35 \times 10^{-8}$ | 3.57 |
| | 1.7 mil[5] | | |

Notes:
[4] See Notes (1) and (2).
[5] Prepared by dissolving 2 grams of resins in 15 ml toluene and casting the solution on glass.

This example shows the preparation of an asymmetric membrane in accordance with the principles of this invention by forming the separation layer by direct application of a solution as a coating on the porous substrate which had been prepared by the coextrusion technique of the invention. As with Example 1, where the asymmetric membrane was prepared by laminating the separation layer to the porous substrate, the resulting invention asymmetric membrane prepared in the manner of this example exhibits excellent selectivity to gases with excellent permeation rates.

EXAMPLE 3

Comparison Of Coating Stabilities Between Commercial Membranes And Membranes From Microlayer Processes A. Support Formation Thin films of polyethylene/polystyrene/styrene-butadiene-styrene block copolymer blend were prepared by using the same method as that in Example 1. The thickness of the film was about 2 to 4.5 mil. They were immersed in chloroform filled bottles. The bottles were loaded in an Eberback mechanical shaker for 16 hours to leach out the polystyrene. The films were then dried in a vacuum oven for 3 hours. According to the mercury intrusion results, the mean pore size of the membrane was about 0.3 micron with a distribution which ranged from 0.07 to 0.5 micron.

B. Comparison Supports

Millipore's Fluoropore FGLP (Cat. #047 00, rated 0.2 micron) and Durapore HVLP (Cat. #047 00, rated 0.45 micron, hydrophilic) membrane filters were used for the comparison. They were chosen as comparison support structures because the rated pore size was close to that of the prepared membrane substrate.

C. Separation Layer Formulation

Dilute polymer solutions were prepared by dissolving 2 grams of the polymer into 15 ml solvents. The following polymer solutions were prepared for the study. Polyethersulfone (PES) (Victrex® 300P from ICI Americas Inc.) in dimethylformamide (DMF); polyarylate (PAL) (Ardel® D-100 from Union Carbide) in chloroform; poly(2,6-dimethyl-p-phenylene oxide) (PPO) (from Aldrich Chemical) in chloroform; high impact polystyrene (HIPS) (Styron® 492U from Dow Chemical) in chloroform; styrene-butadiene block copolymer (SBBC) (K- resine from Phillips Petroleum) in toluene.

Three drops of the polymer solution were put on each of the support surfaces (i.e., the invention support and the commercial supports) at the same spot by using an eye dropper; observations were made on the coated surface and the other side of the membrane to see if the coating solution penetrated through the membrane in the time period before the coating was completely set. When a membrane was wet through by the coating solution, an obvious wetting mark could be observed on the reverse side of the membrane together with a gradual sinking of the solution on the coated side. When the coating solution partially penetrated through the membrane, wetting or penetration marks could be observed under transmitted lights with naked eyes before drying. When the coating was set on the coated surface without wetting or penetrating through the membrane, a thin layer of film could be observed under a light microscope; wetting or penetration marks would not appear on the membrane under transmitted lights during setting. The result of the study based on these criteria is shown in the following table:

| Sample No. | 3-1 | 3-2 | 3-3 |
|---|---|---|---|
| Membranes | Millipore FGLP, 0.2 micron | Millipore HVLP, 0.45 micron | Prepared from this example |
| Thickness, mil | 6 ~ 6.5 | 4.2 ~ 4.9 | 2.7 ~ 4.5 |
| PES/DMF | hold | wet thru | wet thru |
| PAL/CHCl$_3$ | wet thru | wet thru | partially wet |
| PPO/CHCl$_3$ | partially wet | wet thru | hold |
| HIPS/CHCl$_3$ | hold | partially wet | partially wet |
| SBBC/Toluene | wet thru | wet thru | hold |

The results indicate that the supports made per this example can be coated with PPO/CHCl$_3$ and SBBC/toluene solutions; especially for the latter, in which a uniform coating with good adhesion on the substrate was obtained; while the two commercial millipore membranes could not successfully hold the two coating solutions. Although the performance depends also on factors such as the molecular weight of the coating, viscosity of the coating solution and the interfacial properties of a specific system, etc., the result obtained here shows that the general performance of the prepared membrane is better than that of the HVLP (0.45 micron) grade, and equivalent to or better than that of the FGLP (0.2 micron) grade for the chosen coating solutions.

The embodiments of the invention in which an exclusive property or privilege is claimed are defined as follows:

1. A method for preparing an asymmetric membrane comprising a separation layer and a microporous support layer comprising providing a membrane support structure by:
forming a lamellar polymeric composition by dividing and reorienting a plurality of adjacent layers of polymeric materials, each layer comprising at least two different polymeric materials and having a thickness of from 0.03 to 5 microns to form discrete domains of said polymeric materials of random orientation, at least one of said different polymeric materials having a preferential solubility in a selected solvent with respect to at least one other of said different polymeric materials;
forming a melt composition of said lamellar polymeric composition into a thin solid support structure; and
converting said thin solid support structure to an asymmetric membrane by:
(A) providing a separation layer on one major surface of said support structure and treating said separation layer-coated support structure with an extraction medium which is substantially inert with respect to said separation layer to remove said preferentially soluble polymeric material to provide an asymmetric membrane structure comprising at least one separation layer and at least one porous support layer; or
(B) contacting said solid support structure with an extraction medium which has a preferential solubility for at least one of said at least two different polymeric materials, whereby said preferentially soluble polymeric material is removed from said solid support structure to form a porous structure and providing a separation layer on one major surface of said porous structure.

2. A method in accordance with claim 1 wherein said lamellar composition includes a compatibilizing component interdigitated between each of said adjacent layers of polymeric materials.

3. A method in accordance with claim 1 wherein said different polymeric materials comprise polyethylene and polystyrene.

4. A method in accordance with claim 2 wherein said compatibilizing layer comprises a styrene-butadiene-styrene block copolymer.

5. A method in accordance with claim 4 wherein said different polymeric materials comprise polyethylene and polystyrene.

6. A method in accordance with claim 1 wherein said separation layer comprises polyisobutylene.

7. A method in accordance with claim 6 wherein said different polymeric materials comprise polyethylene and polystyrene.

8. A method in accordance with claim 6 wherein said lamellar composition includes a compatibilizing layer interdigitated between each of said adjacent layers of said polymeric materials.

9. A method in accordance with claim 8 wherein said compatibilizer comprises a styrene-butadiene-styrene triblock copolymer.

10. A method in accordance with claim 9 wherein said differemt polymeric materials comprise polyethylene and polystyrene.

11. A method for preparing asymmetric membranes in accordance with claim 1 comprising treating said solid support structure by:
contacting said solid support structure with an extraction medium which has a preferential solubility for at least one of said at least two different polymeric materials, whereby said preferentially soluble polymeric material is removed from said solid structure to form a porous structure; and
providing a separation layer on one major surface of said porous support structure.

12. A method in accordance with claim 11 wherein said lamellar compositon includes a compatibilizing component interdigitated between each of said adjacent layers of said polymeric materials.

13. A method in accordance with claim 11 wherein said different polymeric materials comprise polyethylene and polystyrene.

14. A method in accordance with claim 12 wherein said compatibilizing layer comprises a styrene-butadiene-styrene block copolymer.

15. A method in accordance with claim 14 wherein said different polymeric materials comprise polyethylene and polystyrene.

16. A method in accordance with claim 11 wherein said separation layer comprises polyisobutylene.

17. A method in accordance with claim 16 wherein said different polymeric materials comprise polyethylene and polystyrene.

18. A method in accordance with claim 16 wherein said lamellar composition includes a compatibilizing layer interdigitated between each of said adjacent layers of said polymeric materials.

19. A method in accordance with claim 16 wherein said compatibilizer comprises a styrene-butadiene-styrene triblock copolymer.

20. A method in accordance with claim 19 wherein said different polymeric materials comprise polyethylene and polystyrene.

21. A method in accordance with claim 11 wherein said separation layer comprises polyarylate resin.

22. A method in accordance with claim 21 wherein said separation layer is formed by laminating a dense polyarylate resin separation layer to one major surface of said porous support structure.

23. A method in accordance with claim 11 wherein said separation layer comprises styrene-butadiene copolymer resin.

24. A method in accordance with claim 23 wherein said separation layer is formed by coating a solution of said styrene-butadiene copolymer resin onto one major surface of said solid support structure.

25. A method for preparing asymmetric membranes in accordance with claim 1 wherein said thin solid support structure is treated by:
providing a separation layer on one major surface of said support structure; and
treating said separation layer-coated support structure with an extraction medium which is substantially inert with respect to said separation layer to remove said preferentially soluble polymeric material to provide an asymmetric membrane structure comprising at least one separation layer and at least one porous support layer.

26. A method in accordance with claim 25 wherein said lamellar composition includes a compatibilizing component interdigitated between each of said adjacent layers of polymeric materials.

27. A method in accordance with claim 25 wherein said different polymeric materials comprise polyethylene and polystyrene.

28. A method in accordance with claim 26 wherein said compatibilizing layer comprises a styrene-butadiene-styrene block copolymer.

29. A method in accordance with claim 28 wherein said different polymeric materials comprise polyethylene and polystyrene.

30. A method in accordance with claim 25 wherein said separation layer comprises polyisobutylene.

31. A method in accordance with claim 30 wherein said different polymeric materials comprise polyethylene and polystyrene.

32. A method in accordance with claim 30 wherein said lamellar composition includes a compatibilizing layer interdigitated between each of said adjacent layers of said polymeric materials.

33. A method in accordance with claim 32 wherein said compatibilizer comprises a styrene-polybutadiene-styrene triblock copolymer.

34. A method in accordance with claim 33 wherein said different polymeric materials comprise polyethylene and polystyrene.

* * * * *

UNITED STATES PATENT AND TRADEMARK OFFICE
CERTIFICATE OF CORRECTION

PATENT NO. : 4,873,037

DATED : October 10, 1989

INVENTOR(S) : C. C. Chau, Jang-Hi Im, Otto Carl Raspor, and Lu Ho Tung

It is certified that error appears in the above-identified patent and that said Letters Patent is hereby corrected as shown below:

On the title page under U.S. PATENT DOCUMENTS, after 4,623,670 11/1986 Mutoh et al. . . . . 521/61 insert therefor --4,673,418 6/1987 Peinemann . . . . 264/41 X--.

On the title page under U.S. PATENT DOCUMENTS, after 4,673,418 6/1987 Peinemann . . . . 264/41 X insert therefor --4,746,333 5/1988 Peinemann et al. . . . . 264/41 X--.

On the title page after the U.S. PATENT DOCUMENT 4,746,333 5/1988 Peinemann et al., insert therefor --OTHER PUBLICATIONS, Bierenbaum et al., "Microporous Polymeric Films". Ind. Eng. Chem., Prod. Res. Develop., Vol. 13, No. 1, 1974--.

UNITED STATES PATENT AND TRADEMARK OFFICE
CERTIFICATE OF CORRECTION

PATENT NO. : 4,873,037

DATED : October 10, 1989

INVENTOR(S) : C. C. Chau, Jang-Hi Im, Otto Carl Raspor, and Lu Ho Tung

It is certified that error appears in the above-identified patent and that said Letters Patent is hereby corrected as shown below:

Column 4, line 56, "98" should correctly appear as --90--.

Column 7, line 64, "coextrusio" should correctly appear as --coextrusion--.

Column 7, line 65, "3,656,985" should correctly appear as --3,565,985--.

Column 8, line 59, "repretitively" should correctly appear as --repetitively--.

Column 8, line 67, "definig" should correctly appear as --defining--.

Column 9, line 35, "figuratin" should correctly appear as --figuration--.

Column 9, lines 50 and 51 "mixuture" should correctly appear as --mixture--.

UNITED STATES PATENT AND TRADEMARK OFFICE
CERTIFICATE OF CORRECTION

PATENT NO. : 4,873,037

DATED : October 10, 1989

INVENTOR(S) : C. C. Chau, Jang-Hi Im, Otto Carl Raspor, and Lu Ho Tung

It is certified that error appears in the above-identified patent and that said Letters Patent is hereby corrected as shown below:

Column 11, line 24, "separatin" should correctly appear as --separation--.

Column 12, line 5, "whic" should correctly appear as --which--.

Column 12, line 68, "epxoy" should correctly appear as --epoxy--.

Column 14, line 26, insert therefor a space between the words bottles and were.

Column 18, line 38, "differemt" should correctly appear as --different--.

Signed and Sealed this

Sixteenth Day of October, 1990

Attest:

HARRY F. MANBECK, JR.

*Attesting Officer*      *Commissioner of Patents and Trademarks*